United States Patent
Lutz et al.

(10) Patent No.: US 9,536,211 B2
(45) Date of Patent: Jan. 3, 2017

(54) SERVICE SYSTEM AND SERVICE METHOD

(75) Inventors: Werner Lutz, Oftersheim (DE); Georg Ratz, Kronau (DE); Wolfgang Stark, Mannheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 867 days.

(21) Appl. No.: 13/029,300

(22) Filed: Feb. 17, 2011

(65) Prior Publication Data

US 2011/0202148 A1    Aug. 18, 2011

(30) Foreign Application Priority Data

Feb. 17, 2010   (DE) .................. 10 2010 008 340

(51) Int. Cl.
*A01K 5/02*       (2006.01)
*G06F 17/50*      (2006.01)
*G06Q 10/06*      (2012.01)

(52) U.S. Cl.
CPC .................... *G06Q 10/06* (2013.01)

(58) Field of Classification Search
None
See application file for complete search history.

(56) References Cited

U.S. PATENT DOCUMENTS

| | | | |
|---|---|---|---|
| 6,061,668 A * | 5/2000 | Sharrow | 705/400 |
| 6,903,831 B1 * | 6/2005 | Rapke-Kraft et al. | 358/1.13 |
| 7,287,473 B2 | 10/2007 | Kleibaumhueter et al. | |
| 7,788,356 B2 * | 8/2010 | Bishop et al. | 709/223 |
| 7,950,063 B2 | 5/2011 | Oelsner | |
| 2001/0015376 A1 * | 8/2001 | Vidondo | 235/384 |
| 2003/0028829 A1 * | 2/2003 | Slater et al. | 714/47 |
| 2005/0203755 A1 * | 9/2005 | Krishnamoorthy | 705/1 |

OTHER PUBLICATIONS

Wikipedia-Article: "Konfigurationsmanagement" [Configuration management], Jan. 28, 2010, http://de.wikipedia.org/w/index.php?title=Konfigurationsmanagement&oldid+6993 1659.

* cited by examiner

*Primary Examiner* — Fateh M Obaid
(74) *Attorney, Agent, or Firm* — Laurence A. Greenberg; Werner H. Stemer; Ralph E. Locher

(57) ABSTRACT

A service system includes at least one administration computer having a display device and a user interface for administering machines having components. A respective configuration of components of delivered machines is stored in the administration computer. When a component in one of the machines in the administration computer is exchanged, a spare part that has been installed is stored in the administration computer instead of an original component. A current configuration of the components can be displayed on the display device by operating the user interface, for each of the machines stored in the administration computer. A servicing method is also provided.

10 Claims, 2 Drawing Sheets

SERVICE SYSTEM AND SERVICE METHOD

CROSS-REFERENCE TO RELATED APPLICATION

This application claims the priority, under 35 U.S.C. §119, of German Patent Application DE 10 2010 008 340.2, filed Feb. 17, 2010; the prior application is herewith incorporated by reference in its entirety.

BACKGROUND OF THE INVENTION

Field of the Invention

The present invention relates to a method of servicing and a service system including at least one administration computer with a display device and a user interface for administering machines having components.

Expensive capital equipment, such as printing presses, needs to be available 24/7, if possible, to be able to retrieve the investment cost. Important aspects in ensuring that high degree of availability is an optimum planning of service and repair work on those machines and a reduction of service and repair work to a minimum to avoid unnecessary downtime. In the past few years, remote servicing has turned out to be a particularly suitable way of attaining that aim. Remote service systems mostly are formed of a computer, which is connected to the machine that requires servicing, and an administration computer located at the manufacturer's site or at the manufacturer's service partner. The administration computer and the machine's computer communicate through an internet connection. An important advantage thereof is that malfunction reports from the machine requiring servicing may at once be automatically transmitted to the administration computer at the manufacturer's location so that corresponding service and repair operations may automatically be initiated. Moreover, problems may be spotted in advance and thus service and repair works may be done before more serious repairs that would necessitate longer downtime are required.

A method and system of remote service of that kind is known from U.S. Pat. No. 6,903,831 B1. When a fault or malfunction occurs on an electronic component in a printing press, the relevant electronic component and corresponding fault information will be displayed to the operator on a screen. The operator is additionally given the associated spare part number and, if desired, a corresponding drawing of the spare part so that he or she will be able to easily order the component. In addition, the control unit of the printing press is connected to a remote service computer through a telecommunication line when a program for eliminating the fault is accessed. That remote service computer may additionally be used to update the electronic documentation on the machine computer when new components are installed or added to the machine computer. In addition, the operating system of the machine computer is able to record and store the machine history to keep a record of the malfunctions that have occurred.

U.S. Patent Application Publication No. 2005/0203755 A1 discloses a method and system as well as a program for integrated service management. A system of that kind relies on the creation of a database collecting all the data that are of interest to those who deal with machinery made by a specific manufacturer. That is intended to simplify the creation of a franchise system of service partners, since those partners could then be given access to the server storing the collected data so that the data is available to each service partner. When a partner leaves the franchise system, the manufacturer may ban him or her from accessing the database so that the manufacturer's data are no longer available to a former franchise partner. The database stores sales data, customers' purchases, warranties, service requests, repairs, spare parts, and banking information so that the franchise partners can access the database to obtain a clear picture of their customer at all times.

However, the known prior art does not give an answer to the question of how the service representatives may be enabled at any time to quickly obtain information pertaining to the current structural condition of any machine that has been delivered to a customer and needs servicing. Up-to-date information is particularly important where complex machinery such as printing presses is concerned, which are frequently modified after they were delivered to the customer without the knowledge of the service representative or the manufacturer.

SUMMARY OF THE INVENTION

It is accordingly an object of the invention to provide a service system and a service method, which overcome the hereinafore-mentioned disadvantages of the heretofore-known systems and methods of this general type and which allow quick access to a current structural condition of a machine or installation that has been delivered to a customer in order to be able to plan repair and service operations in an optimum way.

With the foregoing and other objects in view there is provided, in accordance with the invention, a service system, comprising at least one administration computer having a display and a user interface for administering machines having components. The at least one administration computer stores a respective configuration of the components of delivered machines. The at least one administration computer stores a spare part installed in a respective machine instead of an original component upon exchanging a component in one of the machines. The user interface is operable to display a current configuration of the components on the display device for every machine stored in the at least one administration computer.

The service system of the invention is particularly suited for servicing complex machinery and large installations. Installations and machinery of this kind usually have a relatively long useful life of up to 20 years and experience many alterations and add-ons during their useful life. Due to their long life, there is a high probability that for one generation of machines, the manufacturer will make further developments to spare parts under different spare part numbers which are compatible with the initial state of the machine as it was delivered. Alternatively, a larger group of components may be defined as a substitute for an eliminated part. In the past, those issues have made service and repair jobs more time-consuming and difficult, because the structural condition of a machine or installation as it was actually found on site did not correspond to the expected structural condition. In such a case, different spare parts have to be provided or another service technician needs to be called. The results are more travels, questions going back and forth, and increased down time for customers, who are less and less willing to tolerate down time for more and more expensive machinery.

Due to the frequent difference between the material number of the part that was originally delivered and is now defective and the material number of the spare part or assembly that has been delivered as a substitute, it is difficult to identify the causes of technical problems based on spare part consumption. An additional complicating aspect is that the defective part may be present in the machine several times. If the relation between the material number of the defective original part and the substitute spare part as well as the actual location out of the machine-specific parts list where the spare part is installed is noted in an administration system during the technical clarification before or when the spare part is delivered, a subsequent analysis of the causes of the failure may be considerably simplified and accelerated, thus reducing costs. The relation between defective part and delivered spare part in connection with a check as to whether or not the defective part is present in the machine, permits automatic plausibility checks for spare parts to be delivered.

In accordance with the invention, the service system substantially is formed of an administration computer, which is located at the site of the manufacturer of the machine or of a service contractor. This administration computer may in turn be formed of a number of computing units such as servers and clients, with at least one of these computing units including a display device with a user interface for administering the machines delivered by the manufacturer. These machines that have been delivered are composed of a plurality of components, which may be displayed in a machine-specific parts list with a multi-level structure. In accordance with the invention, the administration computer stores the respective configuration of the components of delivered machines. When a component in one of these machines is replaced, the spare part mounted in the respective machine is stored in the memory of the administration computer instead of the original component. The current configuration of components for every machine available in the administration computer is displayable on the display device by using the user interface. This means that for every delivered machine, a machine-specific parts list is available which stores at least all those components that are subject to service and repair requirements.

In accordance with a further feature of the invention, additional, add-on components are stored for each machine, thus ensuring that the current structural condition of a delivered machine may be displayed on the display device of the administration computer at all times at the push of a button and that service and repair jobs can be initiated as required. The core of the system is a machine-specific spare parts list, which is stored in the administration computer. Such a spare parts list is created for every service or malfunction case. Thus is it possible to store a new component that has been substituted for a defective one in the list so that the current structural condition of the machine is updated at all times in the machine-specific parts list. In the same manner, components that had not been present in the machine and have been retrofitted are added to the list, yet without deleting any old components from the machine-specific parts list. Since the pertinent machine-specific parts list always gives the updated structural condition, the manufacturer's service representatives are able to access the current structural condition at the display device at any time and to have the current configuration of components displayed on the display device. Thus quick access to the current parts condition of every delivered machine is possible. The administration computer may be connected to further computing units which are responsible for the implementation of the repair and service jobs, in particular an SAP system.

In accordance with another feature of the invention, the administration computer includes a module for receiving malfunction reports of the machines. This module may be a software module integrated into the administration computer and may communicate with the computer of a delivered machine through an internet connection. When a malfunction occurs in one of the delivered machines, the machine creates a malfunction report which includes the identity of the machine in the form of an unambiguous code number, the malfunction report, and parts that are likely to be involved in the malfunction. This malfunction report may be transmitted to the module for receiving malfunction reports in the administration computer by email over the internet, for instance. This is a way to ensure that malfunction reports may quickly be transmitted to the administration computer of the manufacturer or the service partner without much intervention of the machine operator, thus allowing fast processing of the malfunction report.

In accordance with a further feature of the invention, the administration computer includes a module which checks whether or not the machine is present in the administration computer. Based on the machine number transmitted in the malfunction report, this module is initially used to check whether or not the machine in question is actually included in the administration computer. It is only if the machine is present in the administration computer that the machine can be serviced by the service system of the invention in a suitable way. If the machine is not present in the administration computer, the service representative must obtain information on the structural condition of the machine either on site or by telephone and can then input the data into the administration computer afterwards.

In accordance with an added feature of the invention, the administration computer has a module which, based on the reported failure or malfunction, selects a machine-specific spare parts list and creates a corresponding job to deliver and/or install the spare part in the malfunctioning machine. Like the other modules, this is a software module the purpose of which is to inform the service representative about the spare part to be exchanged that is required for the repair job. The module may also send corresponding information to a spare parts logistics center, where the appropriate spare part will then be automatically selected, packaged, and shipped to the customer or service representative on site.

In accordance with an additional feature of the invention, the administration computer includes a module for checking the availability of spare parts for a machine that has sent a malfunction report to the administration computer. This module reads the numbers of the parts in question in the machine-specific spare parts list and compares them to the available spare parts of the manufacturer or the service partner to automatically ascertain whether the part to be exchanged is immediately available or needs to be ordered.

In accordance with yet another feature of the invention, the administration computer includes a module which receives a confirmation of the installation of the required spare parts including an input of the spare part that has actually been installed and transfers this information to the machine-specific spare parts list in the administration computer. When the service technician makes a repair on site at the customer's location, he or she may either replace the exchanged part by a corresponding new one or, if the corresponding part is no longer available or an improved spare part is available, he or she may install this other spare part in the machine. In order for an up-to-date structural condition of the delivered machine to be available in the administration computer at all times, the administration computer must be informed of this modification. For this purpose, the service representative may be equipped with a mobile phone such as a smartphone or a PDA which may, for instance, be able to establish an internet connection. The mobile phone will display an input screen into which the service representative then enters the number of the spare part that has actually been installed. Together, these data are then transmitted to the administration computer so that in the machine-specific spare parts list in the administration computer, the original component is replaced by the spare part that has actually been installed. Thus an updating of the structural condition of every delivered machine is ensured.

In accordance with yet a further feature of the invention, a quality control module is provided. It is the task of this quality control tool to compare the component that was original to the spare part that is actually planned and installed in order to decide whether an identical component, a dedicated successor part, or possibly a different component was installed. If there is too great a deviation or a non-plausible deviation between the exchanged parts, a corresponding report may be made so that the service representative in front of the administration computer may verify whether the newly installed spare part is actually suitable or whether the repair or order was faulty. This is a way to evaluate and record the quality of the order that has been placed and of the repair that has been made. Due to this type of automated data storage, the manufacturer's R&D department not only receives information on an unusually high consumption of spare parts, but also on which of the originally installed parts have failed prematurely at which location in the machine (if a component is present multiple times in the machine). This is a way to realize problems at an earlier stage.

In accordance with yet an added feature of the invention, the administration computer displays a screen menu on the display device which enables the selection of all those machines that are stored in the administration computer. In this way, the service representative in front of the administration computer may enter a certain serial number of a delivered machine into the screen menu through the use of a mouse or keyboard to have the current component configuration of the selected machine displayed.

With the objects of the invention in view, there is concomitantly provided a method for servicing machines having components. The method comprises providing at least one administration computer having a display and a user interface for administering the machines, storing a respective configuration of the components of the delivered machines in the at least one administration computer, storing a spare part installed in the respective machine in the at least one administration computer instead of an original component, upon exchanging a component in one of the machines, and displaying a current configuration of components on the display device by operating the user interface for every machine stored in the at least one administration computer.

In accordance with the invention, the service system substantially is formed of an administration computer which has an internet connection and software including the corresponding modules which initiate and protocol the service operations and make sure that the machine-specific spare parts list, in particular, and finally the machine-specific component list, is updated. Thus the present invention also relates to a method of servicing through the use of an administration computer including a display device and a user interface for administering machines that have components, wherein the administration computer stores the respective configuration of the components of delivered machines and, when a component in one of these machines is exchanged, the spare part that was installed in the respective machine instead of the original component, and wherein for each of the machines stored in the administration computer, the current configuration of the components is called up on the display device by an operation of the user interface. This also includes corresponding software on a data carrier which controls and runs the aforementioned program.

Other features which are considered as characteristic for the invention are set forth in the appended claims.

Although the invention is illustrated and described herein as embodied in a service system and a service method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
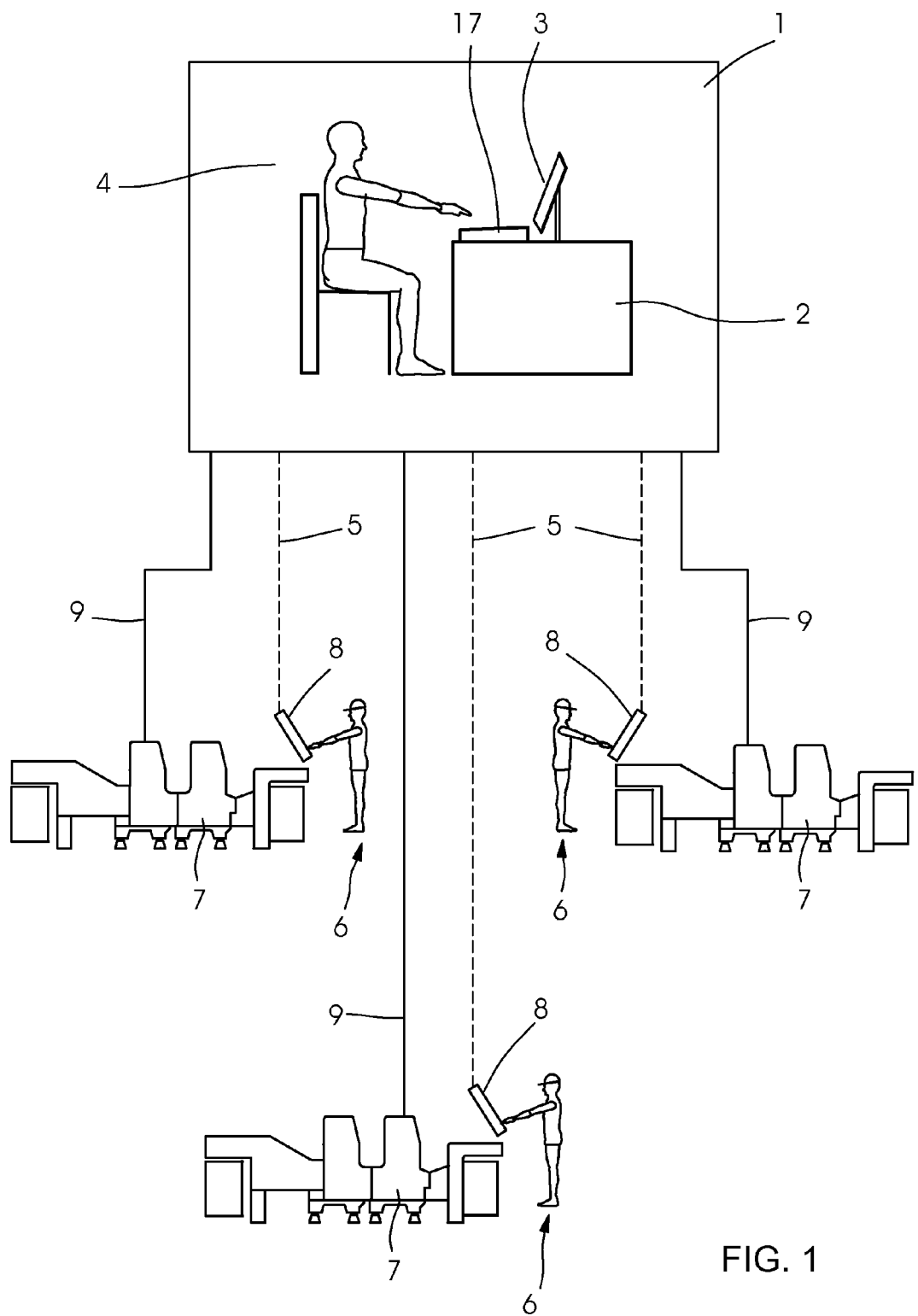
FIG. 1 is a diagrammatic, side-elevational view of components of the service system of the invention.

Referring now to the figures of the drawings in detail and first, particularly, to FIG. 1 thereof, there is seen an administration computer 2, which is located in an administrative building 1 of a manufacturer of printing presses. This administration computer 2 has a screen 3 and a keyboard 17, which the staff or employees 4 of the printing press manufacturer can use to operate the administration computer. Using the keyboard 17, an employee 4 has access to any machine 7 that has been delivered to a customer and to its structural condition and can have the structural condition displayed on the screen 3. The administration computer 2 is connected to machine control units of the delivered machines 7 through internet connections 9. An internet connection 9 can be used to send malfunction reports of the printing presses 7 to the administration computer 2 where they are processed. Conversely, the administration computer 2 may transmit repair instructions or new software and may additionally access the condition of the machine over the internet connection 9.

If an on-site repair is necessary on one of the machines 7, a service technician 6 is sent out with the required spare parts to install the spare parts in the machine 7 on site at the customer's location. Once the repair 7 is completed, the service technician enters the spare parts he or she actually installed into a smartphone 8 which he or she has brought with him or her and which has a wireless internet connection 5 to the administration computer 2. In this way, the data of the machine 7 in question and of the spare parts that have been installed are transmitted to the administration computer 2.

Figure 2:
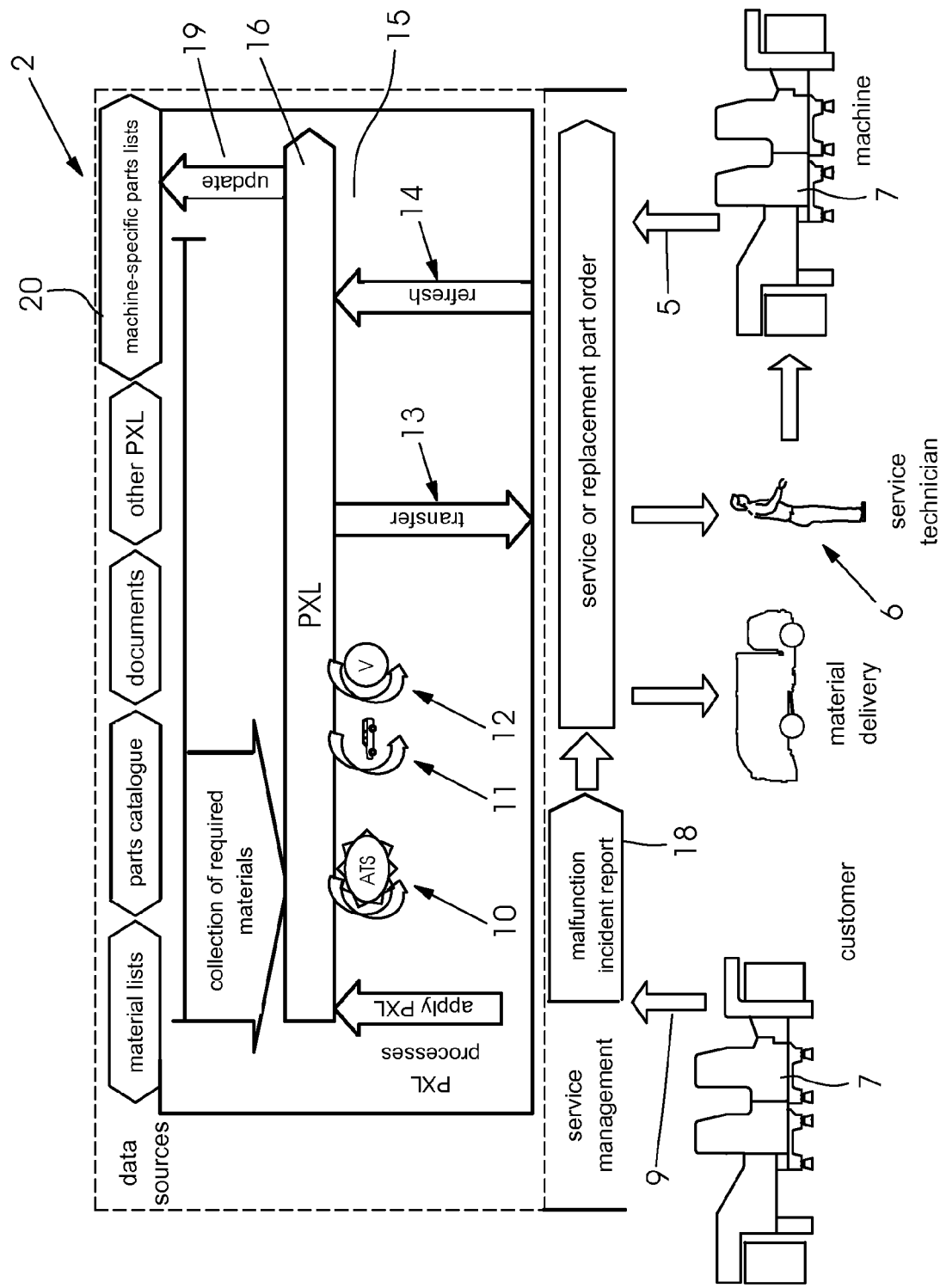
FIG. 2 is a flow chart illustrating a sequence of events of the service system of the invention.

FIG. 2 shows various software modules in the administration computer 2 and their functions. As indicated above, malfunction reports may automatically be sent from a printing press 7 to the administration computer 2 over an internet connection 9. These malfunction reports will then be processed in a module 18 for receiving malfunction reports, which queries the components in question of the machine 7 and the machine number of the machine 7 in question and stores the information in the administration computer 2. In the administration computer 2, machine-specific parts lists 20 listing all relevant machine parts are available for every delivered machine 7. If a machine has a malfunction or needs servicing, the representative 4 of the manufacturer creates a machine-specific spare parts list PXL 16. This machine-specific spare parts list respectively includes the required components and the defective components. Once the malfunction report is received, a module 11 for checking the availability of spare parts checks the availability of the requested spare part. If the required spare part is not available, a further module 10 for an automatic search for alternatives searches suitable alternative spare parts. In addition, a module 12 for checking the existence of the spare parts in the machine 7 checks whether or not the requested spare parts are actually present in the machine 7. In this context, too, the data of the machine-specific parts list 20 are used. When the corresponding spare parts have been found, a further module 13 for transferring the spare parts from the list PXL 16 into the spare parts order automatically creates a service and spare parts order, and a service technician 6 is sent to install the predetermined spare parts.

This service technician 6 has a smartphone 8. The technician installs the required spare parts in the printing press 7 at the customer's location. Once the repair is completed, the service technician 6 enters the data of the installed spare parts and the machine number of the printing press 7 into his or her smartphone 8, which forwards the data to a module 14 of the administration computer 2 over a wireless internet connection 5 to confirm the installation of the spare parts. These data are then added to the machine-specific spare parts list PXL 16 of the machine 7. Through the use of a module 19, the data of the components from the machine-specific spare parts list PXL 16 are transferred to the machine-specific parts list 20 so that the parts removed from the machine are replaced in the machine-specific parts list 20 by the newly installed parts. This is the core of the present invention because in this way the machine-specific components list 20 for every delivered machine 7 is always updated automatically.

Furthermore, FIG. 2 shows that the administration computer 2 includes a module 15 for quality control, which compares the spare parts given so far in the list PXL 16 to the newly installed spare parts, logs deviations if there are any, and sends a warning to the employee 4 of the manufacturer if there is an inexplicable deviation. The warning is displayed to the employee 4 on his or her screen 3. This is a way to ensure that the replacement of the spare parts is correct and plausible. The list PXL 16 not only lists the spare parts number, but also a description of the respective component and, if possible, the installation location of the component. In this way, the employee of the printing press manufacturer 4 can easily see on the screen 3 which component is concerned and where the component has to be exchanged.

Thus, the present invention provides automated administration of successful service solutions, which may be used for later research. In addition, the invention ensures a detailed documentation to ensure that it is clear at all times which part was installed instead of a defective component when a component failed. This is a way to further automate the service process and to obtain detailed documentation of the service operations and the serviced machines 7.

The invention claimed is:

1. A service system, comprising:
    at least one administration computer having a display and a user interface for administering printing presses having components;
    said at least one administration computer storing a respective configuration of the components of delivered printing presses having control units automatically producing a malfunction report;
    said at least one administration computer being located at a site of a manufacturer of the delivered printing presses or of a service contractor;
    said at least one administration computer being connected through Internet connections to the control unit of a delivered printing press;
    said at least one administration computer automatically identifying malfunctioning parts sent in the malfunction reports from the control unit of the printing press;
    said at least one administration computer storing an identification number of a spare part installed in a respective printing press instead of an identification number of an original component upon exchanging a component in one of the printing presses and upon receiving confirmation of the spare part installation over an Internet connection; and
    said user interface being operable to display a current configuration of the components on said display device for every printing press stored in said at least one administration computer.

2. The service system according to claim 1, wherein said at least one administration computer includes a module for receiving malfunction reports of the printing presses.

3. The service system according to claim 1, wherein said at least one administration computer includes a module for checking an availability of spare parts of a printing press having sent a malfunction report to said at least one administration computer.

4. The system according to claim 1, wherein said at least one administration computer includes a module checking a presence of the printing press in said at least one administration computer.

5. The system according to claim 1, wherein said at least one administration computer includes a module selecting a suitable spare part from a list of spare parts specific to a particular printing press based on a reported malfunction and creating a corresponding order to deliver and/or install the spare part in the particular printing press.

6. The service system according to claim 1, wherein said at least one administration computer includes a printing press-specific spare parts list and a module using an internet connection to receive a confirmation of an installation of required spare parts including information on a spare part having actually been installed and to transfer the information to said printing press-specific spare parts list in said at least one administration computer.

7. The service system according to claim 6, wherein the part originally installed in the printing press is replaced by the spare part in said printing press-specific parts list for the respective printing press, after a confirmation of the installed spare part.

8. The service system according to claim 1, which further comprises a quality control module.

9. The service system according to claim 1, wherein said at least one administration computer displays a screen menu on said display device permitting a selection of one of the printing presses stored in said at least one administration computer.

10. The service system according to claim 9, wherein said at least one administration computer has a printing press-specific spare parts list and a computer mouse, and a current configuration based on said printing press-specific spare parts list of the selected printing press is displayed upon pushing a button in said screen menu, once a selection has been made with a keyboard or said computer mouse.

\* \* \* \* \*